(12) United States Patent
Tranier et al.

(10) Patent No.: US 10,988,259 B2
(45) Date of Patent: Apr. 27, 2021

(54) NONCIRCULAR BASE FRAME TUBE CROSS-SECTIONS

(71) Applicant: Safran Seats USA LLC, Gainesville, TX (US)

(72) Inventors: Romain Tranier, Costa Mesa, CA (US); Reza Mansouri, Costa Mesa, CA (US); Guillaume Thomas, Seattle, WA (US); Paul Bouteiller, Paris (FR)

(73) Assignee: Safran Seats USA LLC, Gainesville, TX (US)

( * ) Notice: Subject to any disclaimer, the term of this patent is extended or adjusted under 35 U.S.C. 154(b) by 37 days.

(21) Appl. No.: 16/348,892

(22) PCT Filed: Jul. 13, 2017

(86) PCT No.: PCT/US2017/041818
§ 371 (c)(1),
(2) Date: May 10, 2019

(87) PCT Pub. No.: WO2018/089056
PCT Pub. Date: May 17, 2018

(65) Prior Publication Data
US 2019/0276153 A1    Sep. 12, 2019

Related U.S. Application Data

(60) Provisional application No. 62/420,123, filed on Nov. 10, 2016.

(51) Int. Cl.
*B64D 11/06* (2006.01)

(52) U.S. Cl.
CPC ...... *B64D 11/0648* (2014.12); *B64D 11/0619* (2014.12); *B64D 11/0649* (2014.12); *B64D 11/0693* (2013.01); *Y02T 50/40* (2013.01)

(58) Field of Classification Search
None
See application file for complete search history.

(56) References Cited

U.S. PATENT DOCUMENTS

| 4,736,932 A | * | 4/1988 | Haslim | ................. A47C 7/027 188/83 |
| 5,439,271 A | * | 8/1995 | Ryan | ....................... B60N 2/68 297/218.5 |
| 5,553,923 A | | 9/1996 | Bilezikjian | |

(Continued)

FOREIGN PATENT DOCUMENTS

| WO | 2010117920 | 10/2010 |
| WO | 2015077279 | 5/2015 |

OTHER PUBLICATIONS

International Patent Application No. PCT/US2017/041818, Search Report and Written Opinion, dated Oct. 27, 2017.

(Continued)

*Primary Examiner* — David E Allred
(74) *Attorney, Agent, or Firm* — Kilpatrick Townsend & Stockton LLP (57) ABSTRACT

There is provided a seat base frame (10) comprising one or more base frame tubes (16) having noncircular cross-sections. In a specific example, the tubes (16) have elliptical cross-sections. Further embodiments provide base frame tubes (16) made of magnesium or magnesium alloys.

9 Claims, 5 Drawing Sheets

(56) References Cited

U.S. PATENT DOCUMENTS

| | | | | |
|---|---|---|---|---|
| 6,402,244 | B1* | 6/2002 | Schonenberg | B60N 2/22 |
| | | | | 297/284.11 |
| 6,669,143 | B1 | 12/2003 | Johnson | |
| 6,802,568 | B1 | 10/2004 | Johnson | |
| 7,192,091 | B1* | 3/2007 | Ping Sheng | A47C 1/143 |
| | | | | 297/378.1 |
| 7,926,873 | B2* | 4/2011 | Rombouts | B64D 11/00155 |
| | | | | 297/217.3 |
| 8,550,564 | B1* | 10/2013 | Kismarton | B64D 11/06 |
| | | | | 297/452.55 |
| 10,343,780 | B2* | 7/2019 | Portoles | B64D 11/0649 |
| 2003/0183306 | A1* | 10/2003 | Hehmann | C23C 14/22 |
| | | | | 148/404 |
| 2004/0100137 | A1* | 5/2004 | Johnson | B64D 11/0649 |
| | | | | 297/423.26 |
| 2004/0212243 | A1 | 10/2004 | Johnson | |
| 2011/0193386 | A1* | 8/2011 | Gaither | B64D 11/0649 |
| | | | | 297/316 |
| 2016/0280378 | A1* | 9/2016 | Le | B64D 11/0644 |
| 2016/0340045 | A1* | 11/2016 | Roderwald | B64D 11/0696 |

OTHER PUBLICATIONS

International Patent Application No. PCT/US2017/041818, International Preliminary Report on Patentability (Chapter I of the Patent Cooperation Treaty), dated May 23, 2019.

\* cited by examiner

NONCIRCULAR BASE FRAME TUBE CROSS-SECTIONS

CROSS REFERENCE TO RELATED APPLICATIONS

This application is related to and claims priority benefits from U.S. Provisional Application Ser. No. 62/420,123, filed on Nov. 10, 2016, entitled "Non-Circular Base Frame Tube Cross-Sections," the entire contents of which are hereby incorporated by this reference.

FIELD OF THE INVENTION

The field of the invention relates to base frames for passenger seating, and more particularly to tubular structures designed for use in connection with such base frames.

BACKGROUND

Many vehicles such as passenger aircraft, buses, trains, and the like include seats for bearing passengers en route to a destination. The seats are designed with frames for supporting cushions, pads, and other seating components. A number of factors affect suitability of such passenger seats. Generally, such passenger seats are subject to safety requirements established by governments or other standard-setting organizations. The passenger seats must be able to withstand certain loads experienced during structural tests that mimic crash landing conditions in order to ensure passenger safety in the event of a crash. Passenger comfort is also an important consideration. It is also desirable to reduce the seat's weight (e.g., which may directly affect an amount of fuel and corresponding cost to bear the seat between destinations) and general costs associated with a seat (e.g., cost of production, cost of installation, or cost of maintenance) in order to reduce overall operating costs. Airlines or other passenger aircraft operators may often specify that seats for a particular aircraft or particular class level be of a particular size (e.g., have a specific maximum width or other dimension or fit within a specific footprint or area).

In many situations, however, various of these considerations may conflict with one another. For example, modifying a seat to improve safety in some cases may result in changes that negatively affect weight, size, cost, or other factors. Accordingly, it is desirable to provide improvements in any one of these considerations while remaining within given parameters for the other considerations. The present disclosure provides improved safety and structural features, balanced with weight performance considerations.

BRIEF SUMMARY

The terms "invention," "the invention," "this invention" and "the present invention" or "disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there is provided a seat base frame comprising one or more base frame tubes having noncircular cross-sections. In a specific example, the tubes have elliptical cross-sections. Further embodiments provide base frame tubes made of magnesium or magnesium alloys.

Specific examples provide a base frame for a seat, comprising a first base frame tube comprising a noncircular cross-section; and a second base frame tube comprising a noncircular cross-section. There may be provided one or more seat spreaders and one or more seat legs cooperable with the first and second base frame tubes. The one or more seat spreaders generally have a rear opening and a forward opening, with the rear opening sized and configured to receive the first base frame tube and the forward opening sized and configured to receive the second base frame tube.

In a specific example, the first base frame tube has a long axis and a short axis that collectively define an elliptical shape. In other examples, the long axis and short axis can collectively define a shape having rounded edges.

One of the first or second base frame tubes (or both) may have wall thicknesses differ between the first wall portion and the second wall portion. One of the first or second base frame tubes (or both) may be made of magnesium or a magnesium alloy.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide improved base frames associated with passenger seats.

While the base frames are described for use with aircraft seats, they are by no means so limited. Rather, embodiments of the base frames may be used in passenger seats or other seats of any type or otherwise as desired. For example, embodiments may be used on trains, buses, movie theaters, student seating, or any other instance when seats having a certain structural integrity and load receiving capability may be useful.

Figure 1:
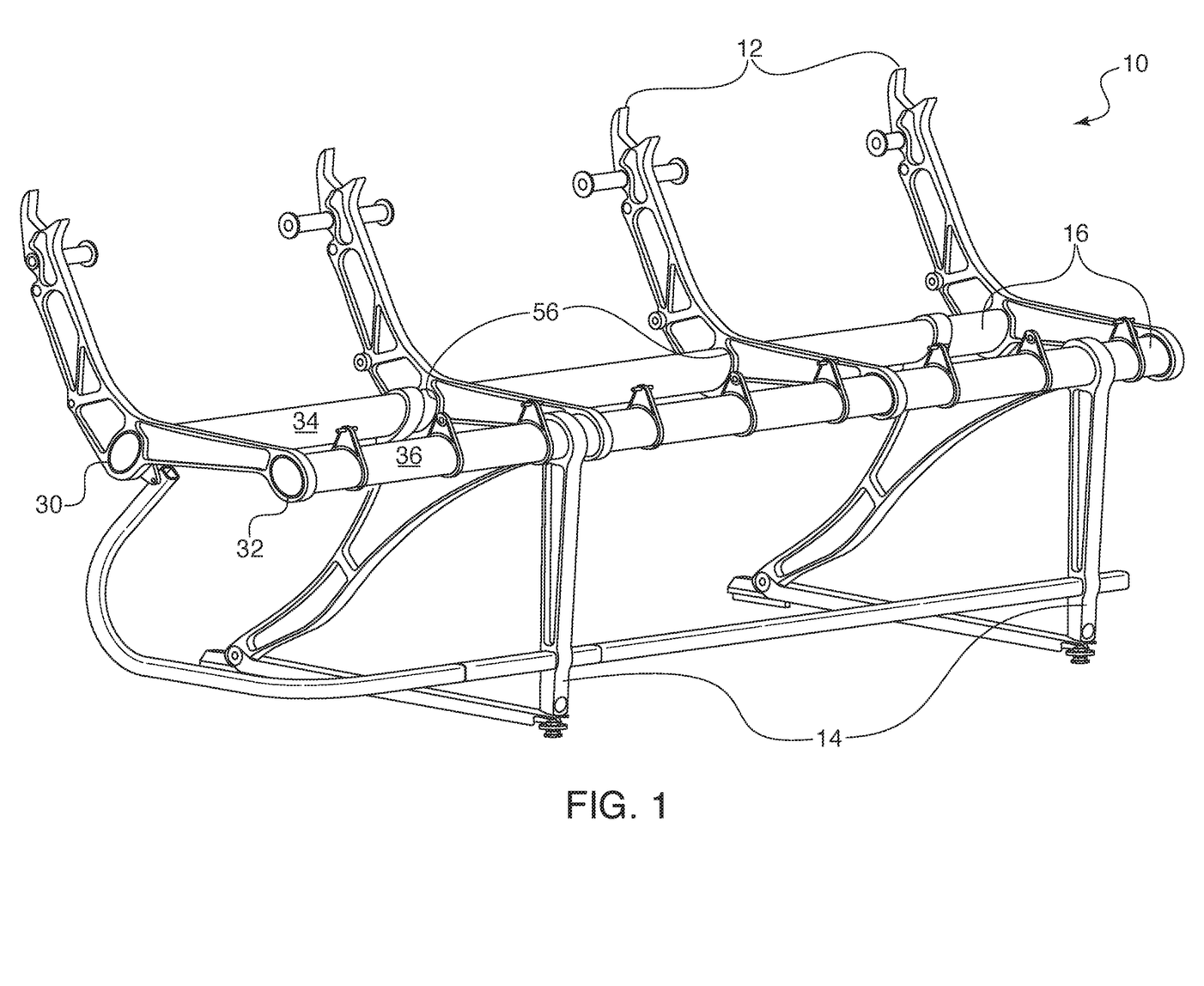
FIG. 1 illustrates a side perspective view of a seat base frame structure having tubes with noncircular cross-sections.
Figure 2:
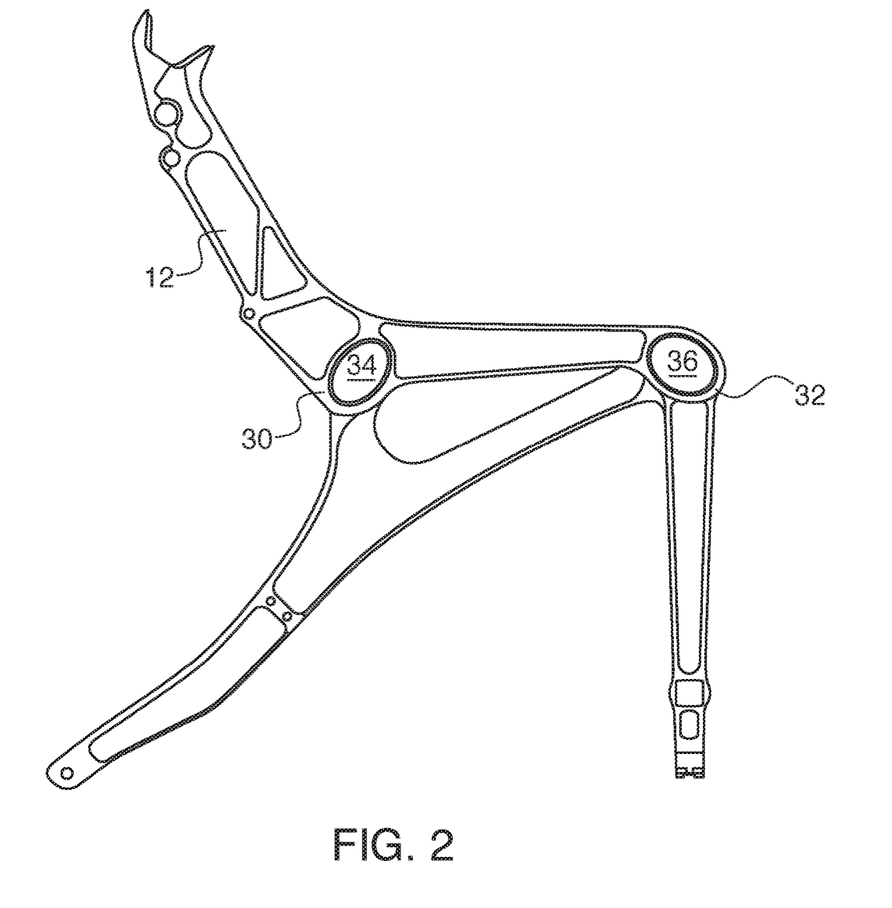
FIG. 2 illustrates a side plan cross-sectional view of the seat structure of FIG. 1.

Economy class seats in an aircraft have structural components that are commonly referred to as a base frame 10. As shown by FIGS. 1 and 2, the base frame 10 is traditionally composed of spreaders 12, legs 14, one or more base frame tubes 16 capable of providing support when the seat experiences stresses due to passenger weight or during a crash landing conditions. These components are assembled to one another using various types of hardware and fasteners. Previously, various designs and optimizations have been performed on the legs and the spreaders in order to achieve lighter weight and/or higher strength. However, the tubes 16 have always remained straight circular tubes. The only changes have been to the tube diameter and the tube thickness, but uniformly.

However, structural tests have evidenced that loading of the base frame during such structural testing (for certification or other testing purposes) is not spread evenly around the tubes. Instead, there are principal directions of loading. This means that a circular tube will always be oversized for its structural role, in order to accommodate the highest load that may be experienced at any particular location along the tube. Circular tubes may thus be heavier than their theoretically achievable weight.

Additionally, circular tubes can rotate inside the spreaders or other seat parts, requiring hardware to prevent this rotation. This additional hardware adds complexity to assembly and weight to the finished seat system.

Figure 3:
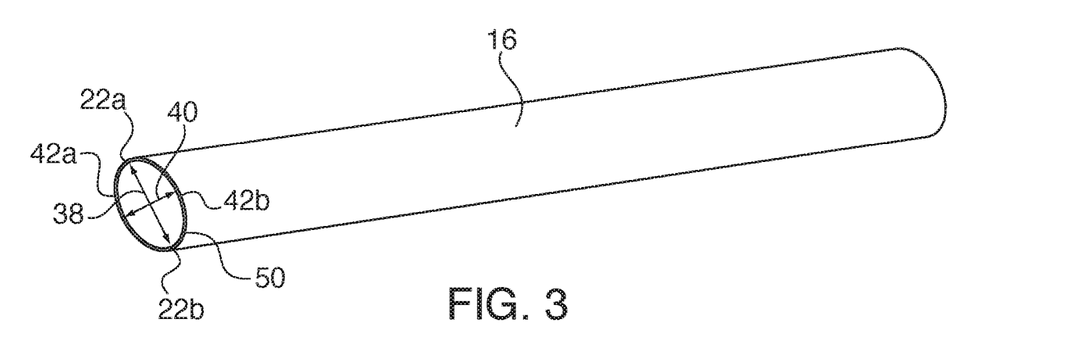
FIG. 3 illustrates a side perspective view of one embodiment of a tube having a noncircular elliptical cross-section.

The present inventors have addressed these two concerns by designing tubes 16 with noncircular cross-sections 18. One example is illustrated by FIG. 3. Testing has shown that such noncircular cross-sections 18 lock rotational degrees of freedom of the tube 16. The noncircular cross-section 18 also orients the inertia and the principal direction of the load experienced by the tube 16.

Figure 4:
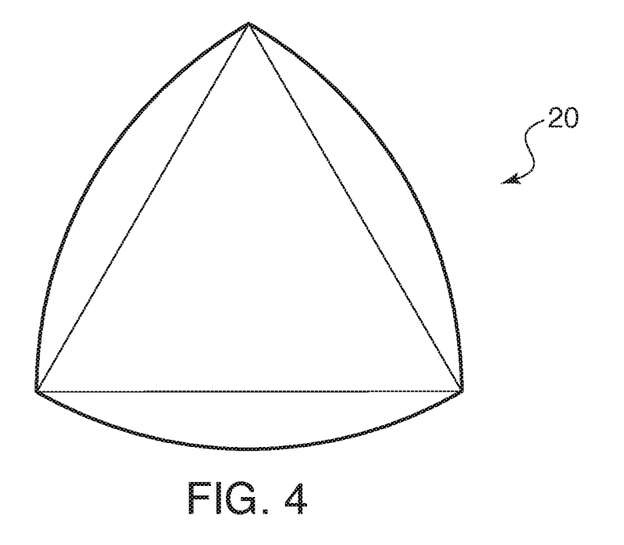
FIG. 4 illustrates a side plan view of one embodiment of a tube having a noncircular reuleaux triangle cross-section.
Figure 5:
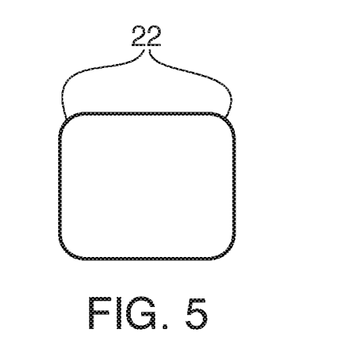
FIGS. 5 and 6 illustrate side plan views of embodiments of a tube having a noncircular square rounded edge cross-sections.
Figure 6:
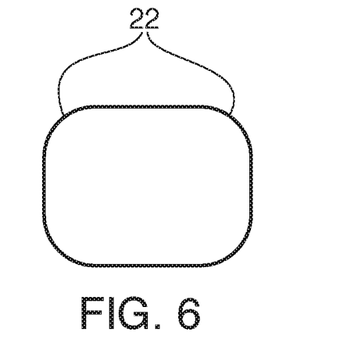
Figure 7:
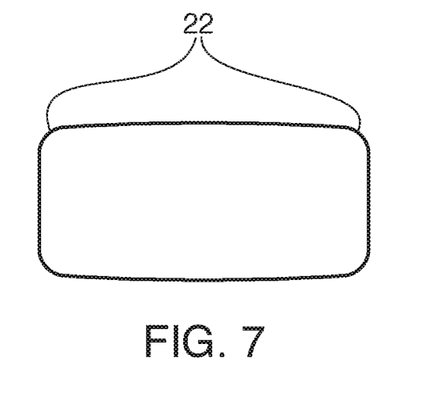
FIGS. 7 and 8 illustrate side plan views of embodiments of a tube having a noncircular rectangular rounded edge cross-sections.
Figure 8:
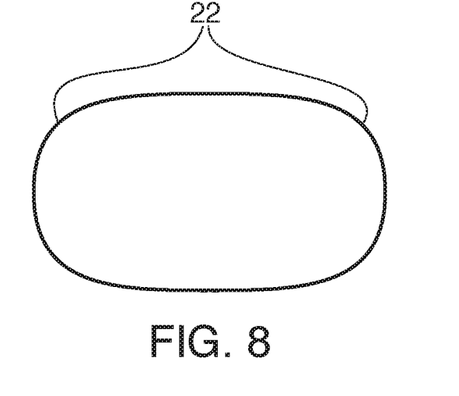

In the embodiments illustrated by the figures, the tubes 16 are illustrated as having elliptical cross-sections. However, it should be understood that potential noncircular cross-sectional shapes may include but are not limited to ovals, a triangular round shape such as a reuleaux triangle 20 (as illustrated by FIG. 4), or any other appropriate noncircular cross-section. It is generally believed that sharp angular transitions may be potential stress raisers and/or may waste material, but traditional square or rectangular shapes may be provided with rounded edges 22 or otherwise an edge radius of curvature, such that these shapes are also possible for use in connection with this disclosure. Examples are illustrated by FIGS. 5-8, which showed various options for alternate noncircular cross-sections with rounded edges 22.

The present inventors have determined how to use computer simulated methodology to help define the desired angle of the sides, as well as the long and short axes of the noncircular cross-sectional tube to be used. They have optimized the tube's inertia (and therefore weight) for structural applications. They have also provided a design that allows use of less hardware for installation, due to the geometrical locking provided by the noncircular tube cross-section. The methodology used to design the tubes uses computer simulation to cut sections along a regular circular tube length and calculates forces and moments through each of the sections. The values are weighted and averaged. The average values are used alongside the standard deviation to the average value in order to define optimal angles and diameters for maximizing load bearing while minimizing tube material. The present inventors have determined that a noncircular cross-section, such as an ellipse, provides unexpected benefits that can be calculated scientifically.

In addition to lowering the weight of the tubes by optimizing load inertia, the noncircular cross-sectional tubes disclosed herein also allow installation with fewer hardware components. Due to the noncircular shape of the tube 16, the tubes 16 can be maintained in place with limited to no lateral movement with respect to the seat spreaders 12. As illustrated by FIGS. 1 and 2, the seat spreaders 12 define angled brackets with a rear opening 30 and a forward opening 32. The rear opening 30 approximates the shape of the rear tube 34. The forward opening 32 approximates the shape of the forward tube 36. Because each of the tubes 34, 36 have a noncircular cross-section 18, once positioned through the openings 30, 32, they become effectively locked into place due to their noncircular shape. The tubes are blocked from rotation. (By contrast, a circular tube positioned in a circular opening would be allowed to rotate with an opening without being clamped for otherwise secured in place.) The ability to maintain the tubes 34, 36 locked or "wedged" into place results in fewer clamps, bolts, hardware, or other fasteners being required in order to secure the seat tubes 34, 36 in place. This effectively lowers the weight of the resulting base frame 10. In one example, it is possible to bond the tubes 34, 36 into place with respect to the seat spreaders 12 in order to prevent movement due to potential aircraft vibration. This bonding may take place using any appropriate adhesives. Non-limiting examples of bonding options also include but are not limited to metal to metal bonding, welding, adhesive bonding, tape loops, combinations thereof, or any other appropriate adhering processes. This can eliminate the need for the traditional securing holes that must be drilled into the tube for receiving rivets or other fasteners.

Figure 9:
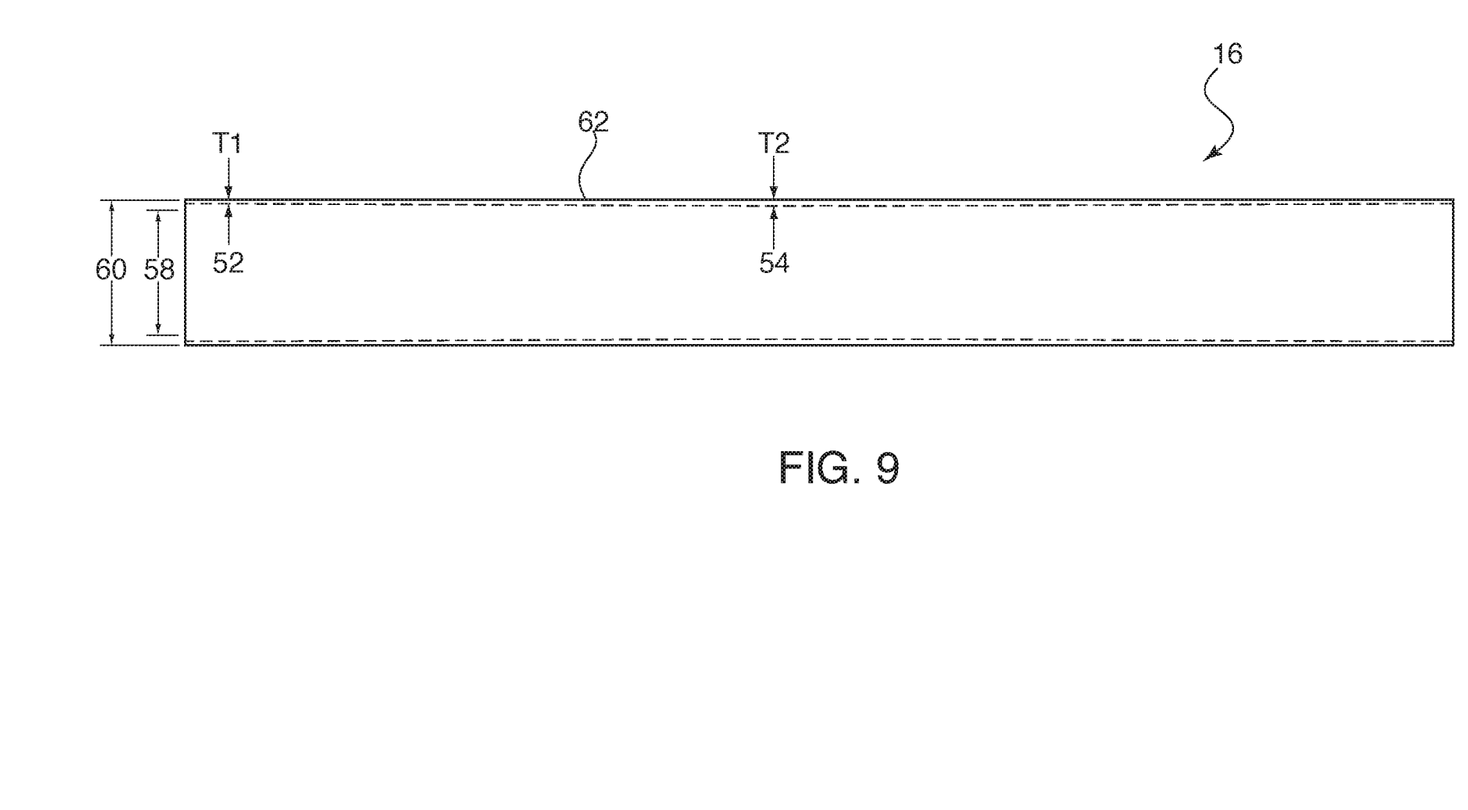
FIG. 9 illustrates a side cross-sectional view of a tube having variable thicknesses along its length.
Figure 10:
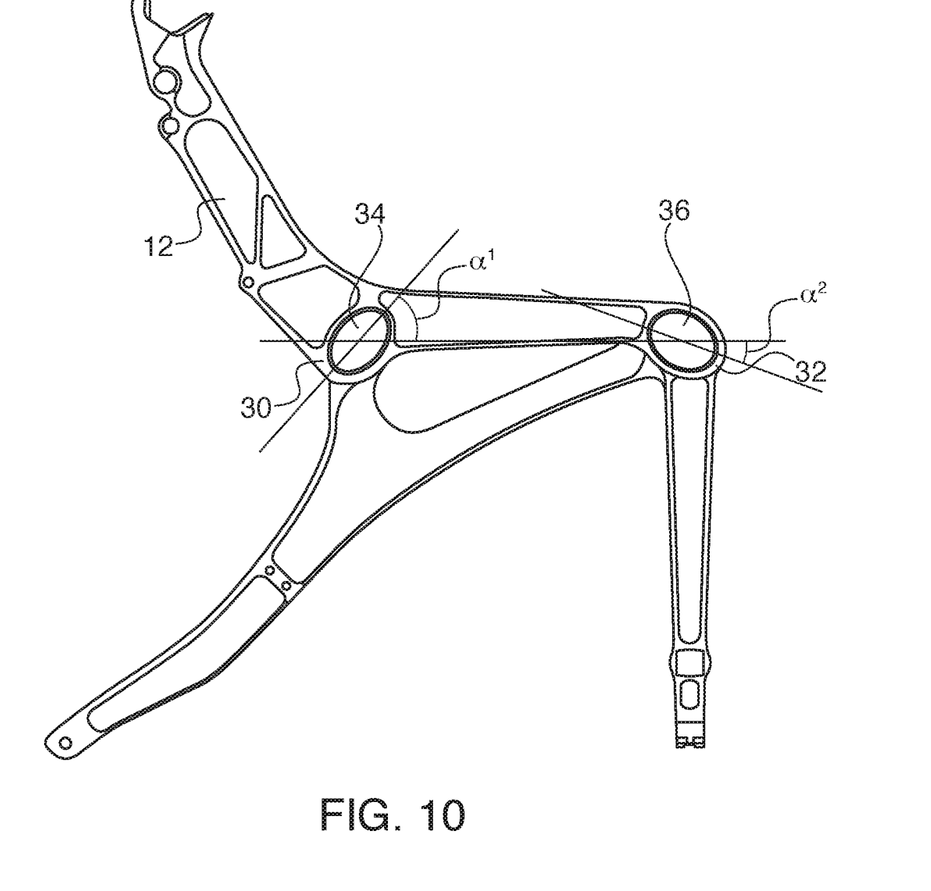
FIG. 10 illustrates the seat structure of FIG. 2 with the angle to horizontal axis marked.

The actual dimensions of the tubes 34, 36 are dependent upon the seat dimensions. As illustrated by the side plan view of FIG. 2, in one particular example, the rear tube 34 may have a cross-section that is slightly flatter than the forward tube 36. For example, each tube may have a long axis 38 and a short axis 40. The long axis 38 is measured as the distance from a first rounded edge 22a to a second rounded edge 22b of the ellipse. The short axis 40 is measured as the distance between flatter edges 42a and 42b of the ellipse. These dimensions will be specific to seat product and components, and it should be understood that these examples are provided for illustrative purposes only. One exemplary but non-limiting set of dimensions for the tubes 34, 36 is provided below for description purposes only:

Rear Ellipse Tube 34:
long axis=60 mm+/−10 mm
short axis=40 mm+/−10 mm
angle to horizontal axis: 45 degrees+/−10 degrees
Front Ellipse Tube 36:
long axis=55 mm+/−10 mm
short axis=45 mm+/−10 mm
angle to horizontal axis: 20 degrees+/−10 degrees These ranges will vary depending upon seat products and components, the strength of material used (including the type of material and wall thickness), and number of other factors. "Angle to horizontal axis" as used above is intended to define an angle between the cabin floor (on which the seat would be mounted) and a line through the long axis of the opening, as illustrated by FIGS. 10, α1 and α2. The wall thicknesses 50 of the tubes 16 (or more specifically rear tube 34 and forward tube 36) may be a constant thickness. This is generally illustrated by the tube portion shown by FIG. 3. An alternate option that may be incorporated into either or both of the noncircular cross-sectional tubes 34, 36 is a variable wall thickness. Examples of variables wall thickness tubes are disclosed by U.S. Pat. Nos. 8,506,015 and 8,974,002. One example is illustrated by FIG. 9. In this example, a first wall portion 52 has a first wall thickness T1 and a second wall portion 54 has a second wall thickness T2. In this example, the second wall thickness T2 is larger than the first wall thickness T1. In a specific example, if T1 is about 1 mm, T2 may be up to about 2 mm, such that it is 1 mm thicker than T1. It is possible to double the thickness with the larger size. In another example, if T1 is about 1.5 mm, T2 may be up to about 3 mm, such that it is 1.5 mm (two times) thicker than T1. The variable thickness of the sidewalls can result in a tube having a variable inner circumference 58 along various portions along the length of the tube. The outer circumference 60 may remain generally constant along the length of the tube. This can allow attachment of the tubes to done without redesigning the assembly process. There can be any number of varied inner circumferences 58 is along the tube. The inner circumferences 58 may be constructed to avoid abrupt transitions or changes. Instead, the transition areas 62 may have a slight slope or taper to them, as illustrated by FIG. 9. This can alleviate tubes stress more evenly as compared to traditional tubes. The different thicknesses may be provided in order to address areas that are expected to experience additional strain. Exemplary locations include but are not limited to connection portions 56, where the tubes cooperate with the seat spreaders 12, shown by FIG. 1. However, it should be understood that in other examples, it is possible for the outer circumference to be varied as well, examples of which are described in the above-referenced patents. (This may require a revised assembly process in order to fit the variously-shaped outer circumference tubes in place.)

A further feature of this disclosure provides the use of new materials for base frame tubes 16. The improved materials described herein may be used in connection with the noncircular cross-sections 18 described above, but they are not intended to be so limited. It is possible to use the improved materials described herein for use with traditional circular tubes. However, the manufacture of noncircular cross-sectional tubes can increase difficulty of controlling tolerances of various materials. The present inventors have explored alternatives.

Current seat tubes are manufactured of aluminum or steel. Many types of aluminums or aluminum alloys require high temperature treatments or heat treatments for tempering after the tubes have been drawn, which can result in distortion of the tube. Such distortions may be violent pressure and movements caused by temperature, which can require a subsequent straightening step for the tube. Due to these and other potential manufacturing limitations and difficulties forecasted to be experienced with aluminum, use of alternate materials has been explored.

In one specific example, the tubes may be manufactured of magnesium (Mg) or one or more magnesium alloys. The use of magnesium may help the drawing and straightening process of the tube to have more controlled tolerance values. Magnesium does not need to be solution treated. It can be aged from T0 to T5 and cooled at air temperature. These features can result in less distortion. This can be a particular benefit for noncircular tubes, for which inertia is not constant all around and for which controlling tolerances can add complexity to the manufacturing process. Use of magnesium or magnesium alloys can inherently allow better control of manufacturing parameters. Use of this material can be effective for both variable tube wall thicknesses and/or noncircular cross-sectional tubes. In certain examples, magnesium alloys contain 90% or greater magnesium.

Specific embodiments of this disclosure find particular use in economy class seats applications. However, it should be understood that the structural tubes described herein may be used in all classes of aircraft seating, including business class seats and first class seats.

In one embodiment, there is provided: a base frame for a seat, comprising: a first base frame tube comprising a noncircular cross-section; and a second base frame tube comprising a noncircular cross-section.

The component of any of the preceding or subsequent examples, further comprising: one or more seat spreaders and one or more seat legs cooperable with the first and second base frame tubes.

The component of any of the preceding or subsequent examples, wherein the one or more seat spreaders comprise a rear opening and a forward opening, the rear opening sized and configured to receive the first base frame tube and the forward opening sized and configured to receive the second base frame tube.

The component of any of the preceding or subsequent examples, wherein the first base frame tube comprises a long axis and a short axis that collectively define an elliptical shape.

The component of any of the preceding or subsequent examples, wherein the first base frame tube comprises a long axis and a short axis that collectively define a shape having rounded edges.

The component of any of the preceding or subsequent examples, wherein at least one of the first base frame tube, the second base frame tube, or both comprise a first wall portion and a second wall portion, wherein wall thicknesses differ between the first wall portion and the second wall portion.

The component of any of the preceding or subsequent examples, wherein at least one of the first base frame tube, the second base frame tube, or both comprise magnesium or a magnesium alloy.

The component of any of the preceding or subsequent examples, wherein the seat comprises an aircraft seat.

In another embodiment, there is provided an aircraft seat, comprising a base frame; one or more seat spreaders; one or more seat legs; and one or more base frame tubes comprising a noncircular cross-section.

The component of any of the preceding or subsequent examples, wherein the one or more base frame tubes comprise a rear base frame tube comprising a noncircular cross-section and a forward base frame tube comprising a noncircular cross-section.

The component of any of the preceding or subsequent examples, wherein at least one of the one or more base frame tubes comprise magnesium or a magnesium alloy.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

What is claimed is:

1. A base frame for a seat, comprising:
a rear base frame tube comprising an elliptical external shape; and
a front base frame tube comprising an elliptical external shape;
wherein each of the rear and front base frame tubes comprises a long axis and a short axis that collectively define the elliptical external shape of each of the rear base frame tube and the front base frame tube;
wherein an axis intersecting a centroid of each of the rear base frame tube and the front base frame tube is horizontal;
wherein the rear base frame tube is positioned such that the long axis of the rear base frame tube slopes forwardly and upwardly at substantially a 35-55 degree angle relative to the horizontal;
wherein the front base frame tube is positioned such that the long axis of the front base frame tube slopes forwardly and downwardly at substantially a 10-30 degree angle relative to the horizontal.

2. The base frame of claim 1, further comprising one or more seat spreaders and one or more seat legs cooperable with the rear and front base frame tubes.

3. The base frame of claim 2, wherein the one or more seat spreaders comprise a rear opening and a forward opening, the rear opening sized and configured to receive the rear base frame tube and the forward opening sized and configured to receive the front base frame tube.

4. The base frame of claim 1, wherein at least one of the rear base frame tube, the front base frame tube, or both comprise a first wall portion and a second wall portion, wherein wall thicknesses differ between the first wall portion and the second wall portion.

5. The base frame of claim 1, wherein at least one of the rear base frame tube, the front base frame tube, or both comprise magnesium or a magnesium alloy.

6. The base frame of claim 1, wherein the seat comprises an aircraft seat.

7. An aircraft seat, comprising a base frame;
one or more seat spreaders;
one or more seat legs; and
one or more base frame tubes each comprising an elliptical external shape,
wherein the one or more base frame tubes comprise a rear ellipse tube and a front ellipse tube,
wherein each of the rear and front ellipse tubes comprises a long axis and a short axis that collectively define the elliptical external shape of each of the rear ellipse tube and the front ellipse tube;
wherein an axis intersecting a centroid of each of the rear ellipse tube and the front ellipse tube is horizontal;
wherein the rear ellipse tube is positioned in the base frame such that the long axis of the rear ellipse tube slopes forwardly and upwardly at substantially a 35-55 degree angle relative to the horizontal;
wherein the front ellipse tube is positioned in the base frame such that the long axis of the front ellipse tube slopes forwardly and downwardly at substantially a 10-30 degree angle relative to the horizontal.

8. The aircraft seat claim 7, wherein at least one of the rear ellipse tube, the front ellipse tube, or both comprise a first wall portion and a second wall portion, wherein wall thicknesses differ between the first wall portion and the second wall portion.

9. The aircraft seat claim 7, wherein at least one of the rear ellipse tube, the front ellipse tube, or both comprise magnesium or a magnesium alloy.

* * * * *